United States Patent [19]

Schielke et al.

[11] Patent Number: 5,430,288
[45] Date of Patent: Jul. 4, 1995

[54] METHOD AND APPARATUS FOR SETTING THE SHARPNESS OF AN OPTICAL IMAGING SYSTEM

[75] Inventors: Rainer Schielke, Fleckeby; Holger Suhr, Kiel; Udo Wurdemann, Klausdorf, all of Germany

[73] Assignee: Linotype-Hell AG, Eschborn, Germany

[21] Appl. No.: 108,553

[22] Filed: Aug. 31, 1993

[30] Foreign Application Priority Data

Feb. 19, 1991 [DE] Germany ............ 41 05 001.0

[51] Int. Cl.⁶ .............................................. G01J 1/20
[52] U.S. Cl. ................................. 250/201.7; 250/234
[58] Field of Search ......................... 250/201.7, 234; 354/402; 355/55

[56] References Cited

U.S. PATENT DOCUMENTS

| 4,010,479 | 3/1977 | Nobusawa ............ 354/25 |
|---|---|---|
| 4,083,056 | 4/1978 | Nakamura et al. ............ 354/25 |
| 4,183,642 | 1/1980 | Fukuoka ............ 354/25 |
| 4,203,031 | 5/1980 | Kamachi et al. ............ 250/201 |
| 4,255,028 | 3/1981 | Aoki ............ 354/25 |
| 4,284,335 | 8/1981 | Takemae et al. ............ 250/201.7 |
| 4,291,958 | 9/1981 | Frank et al. ............ 354/25 |
| 4,641,865 | 9/1986 | Hayashi ............ 250/201.7 |
| 4,641,942 | 2/1987 | Sakai et al. ............ 354/406 |
| 4,660,094 | 4/1987 | Yoshimoto et al. ............ 358/285 |
| 4,883,951 | 11/1989 | Yokoyama et al. ............ 250/201 |
| 4,902,101 | 2/1990 | Fujihara et al. ............ 350/320 |
| 4,908,645 | 3/1990 | Higashihara et al. ............ 354/402 |
| 4,937,620 | 6/1990 | Ozawa et al. ............ 355/77 |
| 4,948,940 | 8/1990 | Ruckl ............ 210/121.68 |
| 4,974,002 | 11/1990 | Ohnuki et al. ............ 354/400 |
| 5,083,150 | 1/1992 | Nagasaki et al. ............ 354/402 |

FOREIGN PATENT DOCUMENTS

| 0347010A1 | 12/1989 | European Pat. Off. . |
|---|---|---|
| 0404523A3 | 12/1990 | European Pat. Off. . |
| 2234448B2 | 3/1976 | Germany . |
| 3141182A1 | 5/1982 | Germany . |
| 3340647A1 | 5/1985 | Germany . |
| 3634609A1 | 1/1988 | Germany . |
| 545437 | 5/1979 | United Kingdom . |

*Primary Examiner*—David C. Nelms
*Attorney, Agent, or Firm*—Hill, Steadman & Simpson

[57] ABSTRACT

A method and apparatus for setting sharpness of an optical image system by step-by-step adjustment of the distance between a subject and an objective until a maximum is achieved for respectively identified sharpness values of the objective.

24 Claims, 3 Drawing Sheets

METHOD AND APPARATUS FOR SETTING THE SHARPNESS OF AN OPTICAL IMAGING SYSTEM

BACKGROUND OF THE INVENTION

The invention is directed to a method and to an apparatus for setting the sharpness of an optical imaging system by step-by-step adjustment of the distance between a subject and an objective until a maximum is achieved for the respectively calculated sharpness values of the objective.

Methods and apparatus for setting the sharpness of an optical imaging system can be used everywhere that imaging systems must be focused with extreme precision to nearly two-dimensional surfaces, for example image originals. Over and above this, methods and apparatus can be particularly advantageously utilized when it is a matter of optimally setting a pre-set focusing condition in a focus re-correction.

Methods and apparatus for setting the sharpness of an optical imaging system and for calculating the focusing condition are already known in the greatest variety of applications and embodiments. Solutions have thus already been recited for the various problem areas (which derive from the type of subject that can be two-dimensional or three-dimensional and low in contrast or high in contrast), from the desired depth of field range, and from the chronological demands and the implementation of the method. German Patent 31 41 182 thus discloses an apparatus for defining the focusing condition of an optical imaging system that enables the identification of the focusing condition of the imaging system such that a stabilized identification of the focusing condition that is largely independent of brief-duration lens-to-image variations is assured. For this purpose, a memory and evaluation circuit is proposed that, however, undertakes numerous steps and is directed to the specific problem.

It has already been proposed for the field of self-focusing microscopes to form the brightness difference of every picture element of a usually three-dimensional original with respect to its two neighboring points with the assistance of a sensor and to add up these brightness differences for all picture elements, to then subsequently adjust the distance between subject and objective, and to again form the sum in order to then select that distance at which the allocated sum is a maximum (German Published Application 33 40 647).

SUMMARY OF THE INVENTION

It is an object of the invention to provide a given focus value which can be quickly and reliably corrected, particularly given knowledge of a region of focus to be anticipated, and wherein a subject-to-lens distance can be automatically set with an optimum sharpness.

In an apparatus of the type initially cited, another goal is to facilitate the operation and, thus, the practical application and, for this purpose, to undertake an automatic sharpness setting with high precision and great reliability, so that a fast adaptation to a modified original and, potentially, modified diameter of an image carrier drum is possible. In particular, it should become possible to calculate the focus at a work preparation means and to transfer it onto a scanner without these two apparatus having to exhibit a high absolute precision. According to the invention, sharpness of an optical imaging system is set by step-by-step adjustment of a distance between a subject and an objective until a maximum is achieved for respectively identified sharpness values of the subject. Sharpness values are determined from a sum of the square differences of image signal values in a line of neighboring pixels, and an initial sharpness value is identified at a prescribed distance between the subject and the objective. The prescribed distance is varied by respective steps in both adjustment directions and first and second sharpness values are identified corresponding to varied first and second distances. A mathematical curve is determined formed by the initial, first, and second sharpness values, the mathematical curve defining sharpness values over distances defined within a range of adjustment between the subject and the objective. A function and coefficients of the function are determined to find the curve. A maximum sharpness value is identified as an apex point on the curve and a corresponding maximum sharpness value distance between the subject and the objective corresponding to the apex point is identified. The objective is adjusted to the distance corresponding to the maximum sharpness value corresponding to the apex point on the curve.

Even slight differences, such as occur given an exact setting, can be reliably processed and stored on the basis of a digital processing, whereby an optimum evaluation is possible on the basis of the squaring. Great differences are weighted more highly than small differences in the sum formation in this way. Which of the focusing conditions belonging to the sharpness values and in what direction a further improvement can be anticipated derive from the sharpness values. When the maximum of the sharpness setting is exceeded, the sharpness value becomes lower and the evaluation and setting of the invention follow. Steps that are initially larger and later smaller can also be selected for the approximation to the desired optimum of the focusing condition until the difference sharpness value falls below a defined limit value; It is thereby indicated that the focusing condition has reached the optimum value at least in an extremely close approximation. A small section of a scan line that, for example, is approximately 512 picture elements long, is expediently employed for the section that is scanned for calculating the sharpness value. A special selection of the image region is only required in specific instances, since the method and the apparatus are designed such that a section in the middle of the image can generally be selected. Image regions having fine modulation (for example, fabric patterns) have thereby especially proven themselves. Black areas on film originals are also well-suited since there is the possibility therein to set the sharpness to the film grain.

The section of the scan line can be approximately 15 mm long given an opaque image original, or it can be approximately 10 mm long given a transparency image original. Of course, departures from these particulars are possible Without further ado within the framework of the invention. Whereas a plurality of clearly distinguished image details should optimally be present within the region scanned for calculating the sharpness value given a manual setting of the sharpness value, this is not necessary in the procedure of the invention since a correspondingly designed apparatus undertakes the evaluation of the image original as a subject differently and independently of the criteria of the human eye.

Practice has shown that the brightness signals of the red channel are particularly suited for acquiring the sharpness value since the cyan separation derived therefrom has the greatest influence on the sharpness impression upon utilization of the scanned image original for an image reproduction in superimposed printing. The magenta separation is also important, whereas the yellow separation is of subordinate significance for the acquisition of the sharpness value.

The scanning is preferably undertaken given a small scanner diaphragm of the imaging system, so that small details can be resolved and their brightness changes take effect. The scanning should thereby be undertaken given a prescribed, slight depth of field of the imaging system, i.e. given a fully open diaphragm of the objective, so that small changes of the focusing condition, particularly small changes of the distance between image original and optical system, have an optimally great influence on the sharpness value.

The focusing condition can be changed with at least one motor, for example a stepping motor. The stepping motor thereby has an extremely small step width, so that the focusing can occur with practically infinite variation. A defined allocation between the focusing condition and the sharpness value obtained is also possible as a result thereof. Over and above this, an adjustment with a piezo drive can also be possible, this operating in a completely infinitely variable way and being capable of taking effect quickly and softly The focusing condition is expediently readjusted by steps from 0.5 through 0.25 mm, and preferably 0.3 mm. Particularly when the optimum is being approached, readjustment steps can be made smaller down to 2 μm (0.002 mm).

Before the first identification of the sharpness value, the focusing condition of the imaging system can be expediently set to a specific initial value that, for example, lies in the proximity of the value to be anticipated for the sharpness setting. Such a setting to an initial value can also be manually undertaken, for example while observing the scanned image, so that, for saving time, a longer adjustment in an unsharp condition is not required.

The setting to at least approximately maximum sharpness can also be undertaken at various locations of the image original and the coordinate values of each of these locations as well as the corresponding focusing conditions can then be stored such that the focusing condition can be automatically readjusted when scanning an image original. This can have significance when the position of the surface of the image original changes in the region to be scanned, for instance due to the fact that the carrier drum is eccentric or the axis of the surface to be scanned is not exactly straight, but sags somewhat. This can be taken into consideration by the automatic readjustment of the focusing condition.

An exemplary embodiment of the invention shall be set forth in greater detail below with reference to the drawings.

DESCRIPTION OF THE PREFERRED EMBODIMENTS

Figure 1:
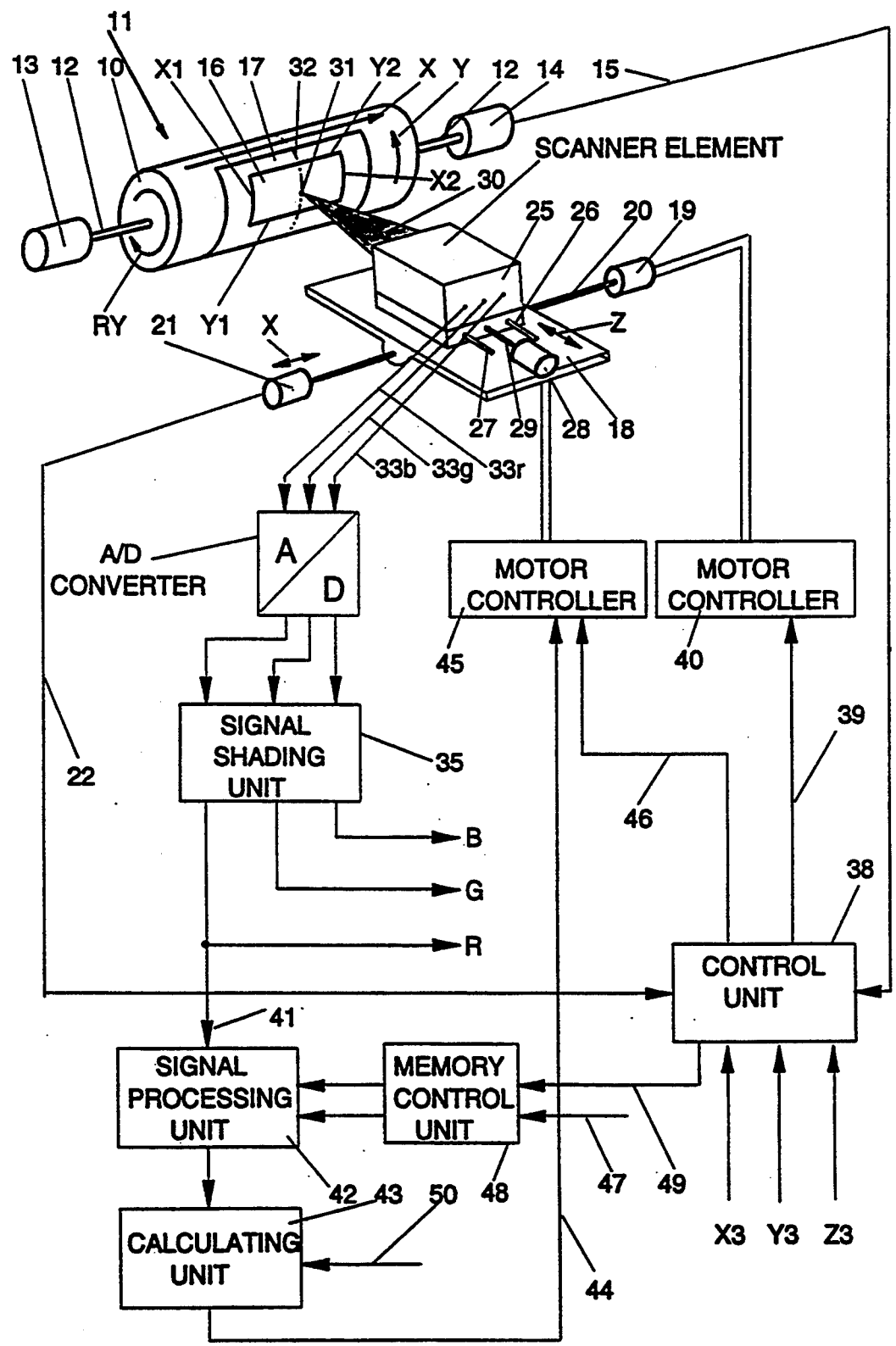
FIG. 1 shows the interacting parts and signal modification stages, partly schematically or in switch stages.

A scan drum 10 of an apparatus 11 for identifying the focusing condition is rotatable around a shaft 12, whose bearing is not shown and is driven by a motor 13 in a RY rotational sense according to the arrow shown at the left-hand face side. A coordinate generator 14 attached to the other end of the shaft 12 supplies a coordinate signal at the line 15 that corresponds to the scanning in the scan window 16 on the original 17 in a Y-direction that proceeds from bottom to top at the front side of the scan drum 10. The electronic scan window thereby defines the region of the original that is to be reproduced.

A feed carriage 18 for the scanning in a X-direction that proceeds from left to right, parallel to the shaft 12 is arranged in front of the scan drum 10, being schematically shown, i.e. particularly without further mechanical bearings, and being moved by a motor 19 with a spindle 20 along the scan drum 10 parallel to the shaft 12. A coordinate generator 21 supplies corresponding X coordinate signals at a line 22.

An opto-electronic scanner element 25 that is guided on slide rods 26 and 27 and that can be displaced in a Z-direction with a spindle 29 driven by a motor 28 is arranged on the feed carriage 18.

In the focused condition, the beam cone 30 belonging to the scanners element 25 should acquire the brightness of a picture element 31 of the original 17 within the scan window 16, this lying on a scan line 32. The measured value color signals for red, green and blue that are thereby obtained are supplied via lines 33r, 33g, 33b to an analog-to-digital converter 34 that, via the signal-shaping unit 35, supplies digital color data R, G and B for the further signal processing.

The measured value color signals R, G and B on the lines 33r, 33g and 33b are digitized into 12 bit color data via the analog-to-digital converter 34 and are edited in the signal-shaping unit 35, for example are logorithimized and subjected to a white balancing. The measured value color signals R, G and B supplied at the output are further-processed, for example subjected to a color correction, and can then be supplied to a recorder (not shown) or to some other recording device.

The scan window 16 on the original 17 defines the coordinates for the region to be scanned, whereby the left-hand edge and the right-hand edge in the axial direction are referenced X1 and, respectively, X2, and the lower edge and the upper edge in the circumferential direction, opposite the rotational sense RY, are respectively referenced Y1 and Y2.

For the desired focus setting for maximum image sharpness, a small scanner diaphragm is brought into the beam path in the scanner element 25, this, for example, effecting a scan point 31 having a diameter of 0.02 mm. This scanner diaphragm can also be employed for the white balancing that is required from time to time in order to set the measured value color signals R, G and B for the further processing.

The scanner diaphragm for the scanning, particularly for the production of a color separation (job diaphragm) derives from the scale calculation and is usually larger than the scan diaphragm for the focus correction. The above-addressed white balancing occurs with the job diaphragm.

For setting the focusing condition, a section of the image original must be scanned with the scan point 31, this section corresponding in FIG. 1 to the middle part 36 of the image line 32, whereby the middle of this section 36 can have the coordinate values X3 and Y3 allocated to it at the point 31. These coordinate values can be input via a central control unit 38 to whose inputs the line 22, on the one hand, with the value of the respective X-coordinate and the line 15 with the value of the respective Y-coordinate are connected and this central control unit 38 controlling the motor controller 40 of the X-direction by the motor 19 to the desired value X3 via an output line 39.

A signal processing unit 42, by whose output the motor controller 45 is actuated for the focus adjustment motor 28 via a calculating unit 43 and a line 44, is driven at the output for the color data R of the signal-shaping unit 35 via a line 41.

From the input Z3, the focusing is set to an initial value via the control unit 38, a line 46, the motor controller 45 and the motor 28. This value can be prescribed in some way or other by a memory; it is also possible to undertake a manual setting via a manually actuated controller, whereby the sharpness is visually judged at the same time in an image reproduction means that is not shown.

Via a connection 47, the signals of the Y-coordinate generator 14 and of the prescribed coordinate value Y3 of the point 31 are supplied by the central control unit 38 to a memory control unit 48, as is also a region signal 49 that identifies the section 36 for the calculation of the sharpness value.

The signal processing unit 42 is then controlled by the memory control unit 48 such that only a part of the color data R corresponding to the section 36 is allowed to pass through to a calculating unit 43. For that purpose, the memory control unit 48 defines the required write clock and a write instruction.

The utilized color data R cover 512 picture elements of the image line 32 corresponding to an image line length of 10 μm in the region of the coordinate value Y3. They are written into the image line memory of the signal processing unit 42. When the height of the scan window 16 is smaller, the number of picture elements for the section 36 is also selected lower.

The image line memory in the signal processing unit 42 has, for example, a capacity of 512×9 bits. Since the color data have 12 bits, only the more significant bits are thus transferred into the image line memory. The image line memory in the signal processing unit 42 is preferably a FIFO memory (first in/first out), whereby the data are successively input and the data that are input first likewise also appear first at the output. The color data R are then supplied to the calculating unit 43 wherein the difference between the color data R of a picture element from the color data of the preceding picture element is formed and squared and the squares acquired in this way are added up, whereby the sum of these squares is formed over a section 36 and represents the sharpness value.

Via the spindle 29, the focus is now adjusted with the motor 28 in an arbitrary direction by a defined value dZ. The size of dZ can be defined with a variation signal supplied to the calculating unit 43 via the line 50, this variation signal being supplied via the line 44 to the motor controller 45. A new sharpness value is then formed and a positive or negative variation signal dZ is supplied to the motor controller 45 dependent on whether this new sharpness value is higher or lower than the earlier sharpness value, and is supplied to the motor controller 45 such that an adjustment in the direction toward a greater sharpness occurs. When the maximum value of the sharpness is exceeded, the adjustment value dZ can be reduced, i.e. from 0.3 mm at the outset to 0.15 mm. Potentially, the focus setting can be repeated in various directions until the maximum sharpness has been at least approximately set.

The curve of the sharpness value dependent on the focus setting Z forms a cone whose apex corresponds to the maximum sharpness. Given three measured points, this curve can be approximated by a circle and, given more measured points, can be approximated by a parabola of the second or of a higher degree with a vertical axis. When, in addition to a highest measured value, at least one measured value lying therebefore and lying thereafter is found, the apex of an approximation curve can be identified by an arithmetic program and the focus setting can be undertaken thereupon. However, only an approximated setting is possible given employment of a stepping motor. The method of the invention for calculating an approximate curve and for defining the point or, respectively, distance with maximum sharpness shall be set forth in yet greater detail below.

One cannot only employ a section 36 of an image line in the middle of the scan window 16 for the calculation of the optimum sharpness setting, but a corresponding sharpness setting is also possible in every other region. Particularly when the surface of the scan window 16 does not lie exactly on the cylinder surface with respect to the shaft 12 or when the scan drum 10 is seated somewhat eccentrically on the shaft or when the scan drum 10 does not exactly correspond to the cylinder surface but sags somewhat in the middle, it can be expedient to undertake a sharpness calculation at at least one other location of the scan window 16. It must thereby be taken into consideration that the scanner drum 10 can initially sag somewhat at the opposite end, particularly given a one-sided chucking. This, however, is eliminated by self-centering after a short run-in time. The identified setting value Z for the focusing means can then be stored in one of the units 42, 4=3 or 48 such that the focusing is somewhat re-adjusted during a scanning of an original. It can be potentially expedient to supplement the motor 28 with a piezo drive with which infinite variations, potentially with a higher speed, are also possible during a drum revolution.

Figure 2:
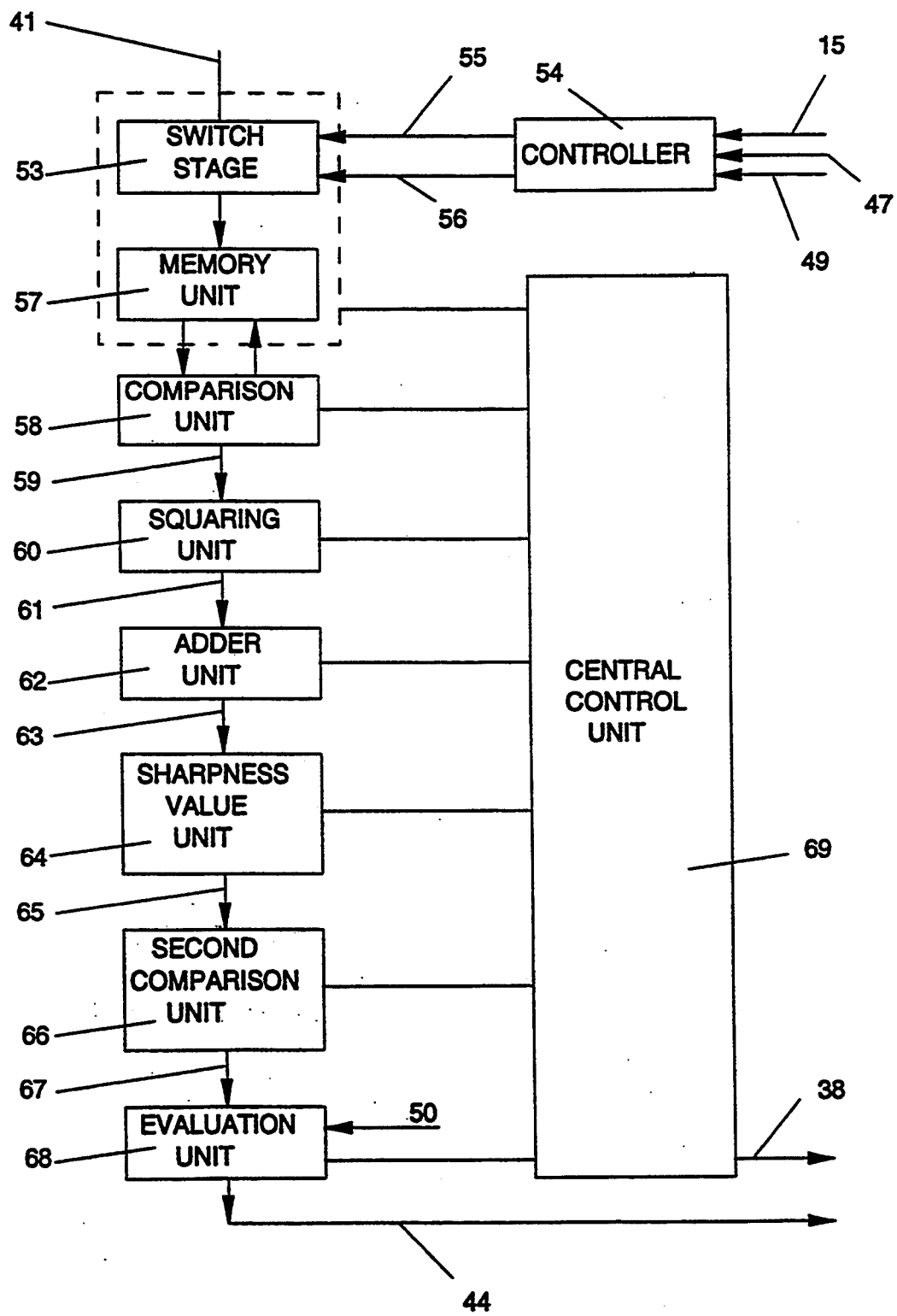
FIG. 2 illustrates the processing for producing and evaluating the sharpness signals with a number of details.

FIG. 2 shows switch stages that are essentially active in the signal processing unit 42, the calculating unit 43 and the memory control unit 48 of FIG. 1.

The color data R of the red channel are supplied by a line 41 to a switch stage 53. The interval stage 54 is driven by the Y-coordinate signal from the line 15, by the Y3-coordinate value of the point 31 via the line 47 and by the Y-region signal 49. Control values, which allow the color data R of the scan line 32 to pass from the start of the section 36 up to its end through to the memory stage 57 and stores them there, are supplied to the switch stage 53 via the lines 55 and 56. The stored color data R are called in pixel by pixel by the comparison unit 58 and the difference signal between the color data of successive pixels is formed and is squared in the following squaring unit 60 connected via a line 59.

The squares obtained in this way are supplied from the output to the squaring unit 60 via a line 61 to an adder unit 62 in which the squares of the difference signals from the line 61 are summed up over the given plurality of pixels that is established by the interval unit 54.

The sum obtained in this way yields the sharpness signal of the corresponding, scanned section and is supplied at the end of thee summation interval to a sharpness value unit 64 and is retained there. When this feed has been carried out, a preparation signal is forwarded to the switch stage 53 via a controller 54, as a result whereof this again accepts the corresponding color data region belonging to the section 36 given the next color data R supplied by the scanner element 25 and forwards them to the memory unit 57. The sharpness Value from the stage 64 is supplied to a second comparison unit 66 wherein the sharpness values of successive scans are compared. The positive or negative difference values obtained in this way are supplied via a line 67 to an evaluation unit 68. Dependent on whether this differences value is positive or negative, a corresponding positive or negative adjustment value dZ is supplied via the line 44 to the motor controller 45. A defined value that effects an adjustment in,larger steps is initially provided for dZ. When, given an approach to the maximum of the sharpness value, the sharpness value differences become smaller, a switch can be undertaken in the evaluation unit 68 to such effect that an adjustment with smaller values dZ only then occurs, whereby the modified value can be previously input from the outside with a Variation signal 50. All units are controlled by a central control unit 69.

Within the framework of the invention, the individual functions, particularly storing and comparison, can also be Combined in function units in a way other than that set forth above and that shown in the exemplary embodiment.

In order to undertake the focus setting or, respectively, focus correction, wherein the distance between the scan original and the objective is set such that a maximum sharpness is achieved, a specific setting or, respectively, correction method is inventively provided in order to reach the optimum setting as quickly as possible. The method can thereby be universally employed. In the present instance, however, it is assumed that a setting value for the optics has already been calculated in the preparation for the scan event, having been calculated in a separate device within the framework of the work preparation for a scan drum on which at least one scan original has been arranged. This pre-set value for the optics as a focus value is identified together with an entire data set that also contains the other setting quantities for a scanner device. This has the advantage that the set-up time of the scanner device is minimized, so that the optimum sharpness setting is achieved with few steps When undertaking the setting or, respectively, correction procedure set forth below.

Figure 3:
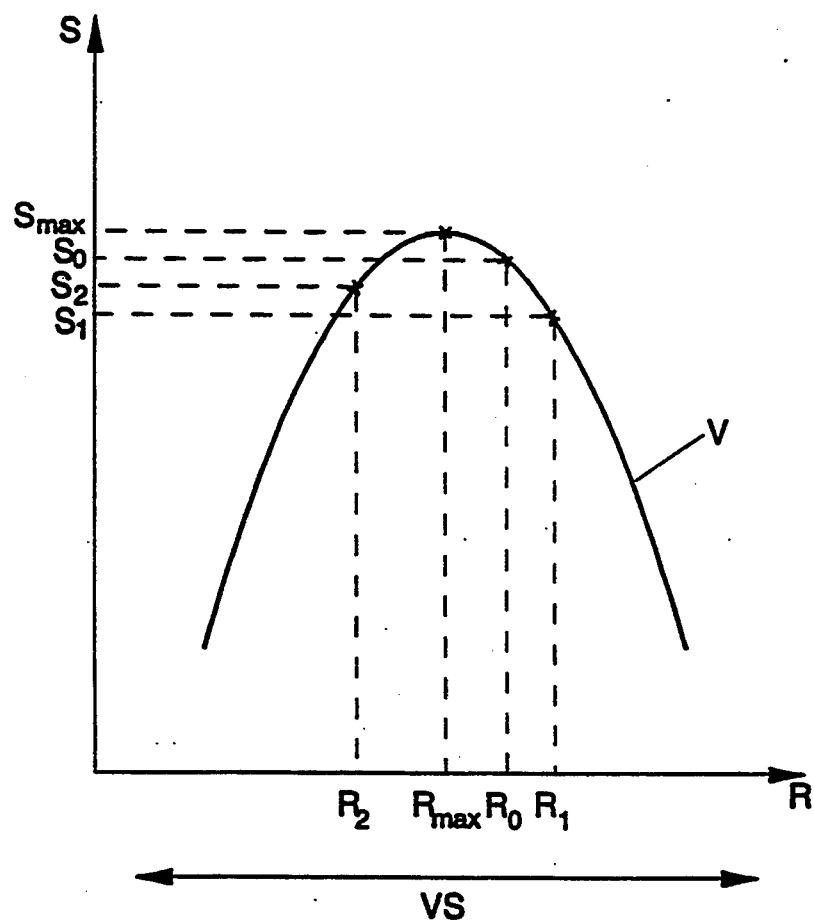
FIG. 3 is a graphic illustration.

In detail, it is thereby provided that, proceeding from the start or prescribed value for the distance between objective and subject identified in the work preparation, an initial or start sharpness value is calculated. The distance between the objective and the subject is then respectively implemented in both adjustment directions by a step having a first, large step width, and the sharpness values respectively corresponding to the first and second distance values lying to the right and left of the prescribed distance value, on an imaginary sharpness curve are calculated. Upon employment of these three sharpness values and based on the experience that the sharpness values over the range of adjustment of the objective are distributed according to a mathematical curve, for example according to a parabola, the three points obtained are considered to be three points of the mathematical curve. The corresponding curve is calculated with mathematically standard methods, i.e. their function equation is identified. The distance value at which the sharpness maximum is present is then calculated. It is therefore not necessary to calculate the concrete sharpness maximum value, since only the corresponding distance value for the objective is sought. This distance value is then approached for a check, the sharpness value is identified and a check is carried out to see whether the sharpness value is larger than the sharpness values of the three initial points. When this is the case, a determination is made that the maximum was capable of being successfully identified (FIG. 3). Otherwise, the adjustment method is aborted.

The sharpness value,calculated in this way already lies in the region of the maximum sharpness value. The reason for this is that, due to the scanning of a two-dimensional original, i.e. an original that essentially comprises no thickness differences, the arrangement of the sharpness values over the range of adjustment with respect to the distance between subject and objective ,distribute along an approximation curve whose apex region can be approximated by a downwardly open parabola or hyperbola. This thereby involves a matter of the curve of the sharpness values over the range of adjustment of the distance between subject and objective. The maximum then need only be found with optimally few steps, whereby the calculation can be achieved with few steps since the region is already approximately prescribed by the pre-adjustment that has been undertaken and deviations from the pre-set value derive anyway only to a slight extent and due to the above-explained influences.

It has been shown that the curve V of the sharpness values S deriving via the setting values R of the distance between the objective and the subject can be approximated by a downwardly open parabola. Two distance points R1, R2, proceeding from the distance point Ro or, respectively, the focus setting value of the previous sharpness value, are therefore defined, namely in every adjustment direction, whereby a step having a large step width of 0.15 mm from the distance point Ro is selected in every adjustment direction. As a protective criterion, a check is carried out to see whether both points lie in a prescribed, possible range of adjustment in order to assure that the objective is not adjusted into the original and thus causes potential damage. In case both points do not lie in the prescribed range of adjustment, the step widths are made corresponding smaller and another check is carried out to see whether all points then lie in the prescribed range of adjustment VS. When this is the case, the sharpness values S1, S2 at the two, prescribed distance points R1, R2 are calculated. These sharpness values So, S1, S2 that are then present are viewed as points of the mathematically requirable approximation curve for the curve V and the mathematical function equation of this approximation curve is calculated with known means. The distance value Rmax that is to be allocated to the apex point of the parabola or hyperbola is then calculated, whereby the setting value of the subject-to-lens distance belonging to the apex point then corresponds to the setting value wherein the maximum sharpness value lies with all probability. The relationships are shown in a purely qualitative way in FIG. 3, whereby the subject-lens distance has been set as the distance radius R of the lens from the rotational axis of the scan drum on which the subject is secured.

The setting value having the greatest sharpness value can be identified and set in this way.

Overall, the execution can be characterized as the application of the following steps:

a) calculating an initial or start sharpness value given an initial prescribed start distance between the subject and the objective;

b) varying the distance by respectively one step having a first (large) step width in both adjustment directions and identification of the first and second sharpness values, so that a total of three sharpness values are present;

c) acceptance of the three sharpness values as points of a mathematical curve of the second, third or of a higher order as a function of the sharpness values over the range of adjustment of the subject-lens distance;

d) identification of the coefficients of the corresponding curve with known geometrical or mathematical steps in the form of the function equation of the curve;

e) identification of the apex point of the curve by calculating the adjustment value of the subject lens distance allocated thereto; and f) setting the identified adjustment value.

The objective can be set to optimum sharpness with few steps in this procedure. The invention thereby utilizes the finding that was already recited above and was surprisingly found that, by contrast to the problems in the sharpness setting of, for example, cameras or microscopes or other optical equipment, the sharpness values distribute along a previously identifiable approximation region, so that the additional steps and test measures often to be provided in the other methods can be essentially foregone here.

It can preferably also be provided that a test criterion is built in and that this, for example, can be comprised therein that a check is made to see whether the most recently identified sharpness value which, of course, represents the maximum sharpness value is higher than all other previously identified sharpness values. It car then be assured that the optimum sharpness value has been set.

In order to further enhance the reliability of the method, it can also be provided that, after implementing the method step of calculating the sharpness values at the two distance points according to step b), a check is first carried out to see whether the two sharpness values are lower than the identified, best sharpness value according to step a) and, given non-satisfaction thereof, a re-start with a larger, first large step width occurs and, otherwise, the method is continued.

Additionally or alternatively, it can also be provided that, following the implementation of the method step of calculating the adjustment value belonging to the apex point according to step b), the appertaining sharpness value is first identified and a check is carried out to see whether the two sharpness values at the two distance points according to step b) are lower than the sharpness value belonging to the apex point and, given non-satisfaction thereof, an abort of the method and a triggering of an abort indication are undertaken and, otherwise, a continuation of the method is undertaken.

Although various minor changes and modifications might be proposed by those skilled in the art, it will be understood that we wish to include within the scope of the patent warranted hereon all such changes and modifications as reasonably come within our contribution to the art.

We claim:

1. A method for setting sharpness of an optical imaging system by step-by-step adjustment of a distance between a subject and an objective until a maximum is achieved for respectively identified sharpness values of the subject, comprising the steps of:

determining sharpness values from a sum of square differences of image signal values in a line of neighboring pixels, and identifying an initial sharpness value at a prescribed distance between the subject and the objective;

varying the prescribed distance by respective steps in both adjustment directions and identifying first and second sharpness values corresponding to varied first and second distances;

determining a mathematical curve formed by the initial, first, and second sharpness values, said mathematical curve defining sharpness values over distances defined within a range of adjustment between the subject and the objective;

determining a function and coefficients of the function defining the curve;

identifying a maximum sharpness value as an apex point on the curve and a corresponding maximum sharpness value distance between the subject and the objective corresponding to the apex point; and adjusting the objective to the distance corresponding to the maximum sharpness value corresponding to the apex point on the curve.

2. A method according to claim 1 wherein, following the identifying of the first and second sharpness values, carrying out a check to see whether the first and second sharpness values are lower than the initial sharpness value, and given non-satisfaction thereof, again varying the distance by a smaller step width in both adjustment directions and determining new first and second sharpness values and then continuing with the subsequent method steps.

3. A method according to claim 1 wherein following identifying the distance corresponding to the apex point and the corresponding maximum sharpness value, carrying out a check to see whether the first and second sharpness values at the first and second distances and the initial sharpness value are lower than the corresponding maximum sharpness value and, given non-satisfaction thereof, aborting the method and triggering an abort indication, and if the initial sharpness value is not lower than the corresponding maximum sharpness value, then continuing subsequent steps of the method.

4. A method according to claim 1 wherein, given an image original as said subject, acquiring image signal values for identification of said sharpness values by point-by-point and line-by-line optoelectronic scanning of the image original.

5. A method according to claim 1 including the step of providing the subject as an image original and utilizing only image signal values of a section of a scanned line of an image original for calculation of the sharpness values.

6. A method according to claim 5 wherein said section is approximately 512 pixels long.

7. A method according to claim 5 wherein said section is approximately 15 mm long given an opaque image original.

8. A method according to claim 5 wherein said section is approximately 10 mm long given a transparency image original.

9. A method according to claim 1 including the steps of providing said subject as a color original and employing a color signal of a red channel for calculation of the sharpness values when scanning the color original.

10. A method according to claim 1 including the step of utilizing only more-significant bits of the digitized image signal values for calculation of the sharpness values.

11. A method according to claim 1 including the step of undertaking a scanning of the subject with an imaging system given a small diaphragm of the imaging system.

12. A method according to claim 1 including the step of scanning the subject with an imaging system given a minimum depth of field of the imaging system.

13. A method according to claim 1 including the step of scanning the subject with an imaging system and varying a focusing condition of the imaging system with at least one stepping motor.

14. A method according to claim 1 including the step of scanning the subject with an imaging system and varying a focusing condition of the imaging system with a piezo drive.

15. A method according to claim 1 including the step of scanning the subject with I, an imaging system and presetting a focusing condition of the imaging system to an initial value before calculation of said initial sharpness value.

16. A method according to claim 15 including the step of calculating said initial value in a separate work preparation device.

17. A method according to claim 1 including the steps of
providing said subject as an image original;
before actual scanning of the image original, determining approximate maximum sharpness values at various locations of the image original;
storing coordinate values of corresponding focusing conditions for the approximate sharpness values; and
for actual scanning of the image original, automatically setting a focusing condition using the stored coordinate values when an original region around a corresponding location of the image original is scanned.

18. A method according to claim 1 wherein said curve is of at least a second order.

19. A method according to claim 18 wherein said curve is of a third higher order.

20. A method for setting sharpness of an optical imaging system by step-by-step adjustment of a distance between a subject and an objective until a maximum is achieved for respectively identified sharpness values of the subject, comprising the steps of:
determining sharpness values from a sum of square differences of image signal values in a line of neighboring pixels, and identifying an initial sharpness value at a prescribed distance between the subject and the objective;
varying the prescribed,distance by steps in both adjustment directions and identifying sharpness values;
determining a mathematical curve formed by the sharpness values, said mathematical curve defining sharpness values over varying distances between the subject and the objective;
identifying a maximum sharpness value as an apex point on the curve and a corresponding maximum sharpness value distance between the subject and the objective corresponding to the apex point; and
adjusting the objective to the distance corresponding to the maximum sharpness value corresponding to the apex point on the curve.

21. An apparatus for setting sharpness of an optical imaging system by step-by-step adjustment of a distance between a subject and an objective until a maximum is achieved for respectively identified sharpness values of the; subject, comprising:
an optical imaging system having an objective;
an adjustment unit for the objective for adjusting a distance between the objective and the subject;
an opto-electronic scanner head;
a first signal processing circuit connected to the scanner head for identifying sharpness values from sums of square differences of image signal values in a line of neighboring pixels;
a second signal processing circuit connected to the first signal processing circuit and to the adjustment unit; and
said second signal processing circuit comprising
means for identifying a starting sharpness value for a given prescribed distance between the subject and the objective;
means for identifying first and second distances determined by varying from said prescribed distance by a first step width in both adjustment directions and identifying corresponding first and second sharpness values;
means for determining a mathematical curve from said initial and first and second sharpness values, said curve representing sharpness values as a function of distances within a range of adjustment of said objective relative to said subject;
means for identifying a function of said curve and coefficients thereof; and
means for determining an apex point of said curve corresponding to a maximum sharpness and a corresponding distance between the subject and the objective.

22. An apparatus according to claim 21 wherein said means for determining said curve determines a curve of at least a second order.

23. An apparatus according to claim 22 wherein said means for determining said mathematical curve determines a curve of at least a third order.

24. An apparatus for setting sharpness of an optical imaging system by step-by-step adjustment of a distance between a subject and an objective until a maximum is achieved for respectively identified sharpness values of the subject, comprising:
an optical imaging system having an objective;
an adjustment unit for the objective for adjusting a distance between the objective and the subject;
an opto-electronic scanner head;
a first signal processing circuit connected to the scanner head for identifying sharpness values from sums of square differences of image signal values in a line of neighboring pixels;
a second signal processing circuit connected to the first signal processing circuit and to the adjustment unit; and
said second signal processing circuit comprising means for identifying a starting sharpness value for a given prescribed distance between the subject and the objective;

means for identifying distances determined by varying from said prescribed distance by a step width in both adjustment directions and identifying sharpness values;

means for determining a mathematical curve from said sharpness values, said curve representing sharpness values as a function of distances of said objective relative to said subject image original; and means for determining an apex point of said curve corresponding to a maximum sharpness and a corresponding distance between the subject and the objective.

* * * * *